(12) United States Patent
Usami et al.

(10) Patent No.: US 7,657,900 B2
(45) Date of Patent: Feb. 2, 2010

(54) RECORDING AND REPRODUCING APPARATUS FOR PHOTOSENSITIVE RECORDING MEDIUM AND CARTRIDGE THEREOF

(75) Inventors: Yoshihisa Usami, Shizuoka (JP); Nobuyuki Tada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 519 days.

(21) Appl. No.: 11/525,051

(22) Filed: Sep. 22, 2006

(65) Prior Publication Data
US 2007/0067784 A1 Mar. 22, 2007

(30) Foreign Application Priority Data

Sep. 22, 2005 (JP) ............................ P2005-276435
Sep. 27, 2005 (JP) ............................ P2005-280126

(51) Int. Cl.
*G11B 17/04* (2006.01)
(52) U.S. Cl. ...................................................... 720/630
(58) Field of Classification Search ....................... None
See application file for complete search history.

(56) References Cited

U.S. PATENT DOCUMENTS 7,492,691 B2 * 2/2009 Earhart ........................ 369/103
2002/0159340 A1 10/2002 Nanba 2003/0198177 A1 10/2003 Horimai et al.
2004/0194151 A1 * 9/2004 Earhart ........................ 725/135

FOREIGN PATENT DOCUMENTS

| JP | 2000187965 A | | 7/2000 |
|----|--------------|---|--------|
| JP | 2001-167526 A | | 6/2001 |
| JP | 2001-319380 A | | 11/2001 |
| JP | 2003-317422 A | | 11/2003 |
| JP | 2007052121 A | * | 3/2007 |
| JP | 2007095198 A | * | 4/2007 |
| JP | 2007095199 A | * | 4/2007 |

OTHER PUBLICATIONS

Japanese Notification of Reasons for Refusal dated Sep. 16, 2009.

* cited by examiner

*Primary Examiner*—Allen T Cao
(74) *Attorney, Agent, or Firm*—Sughrue Mion, PLLC

(57) ABSTRACT

An apparatus for recording and reproduction of a photosensitive recording medium, which accommodates a cartridge, the cartridge including: a photosensitive recording medium; a cartridge body rotatably accommodating the photosensitive recording medium and having an opening through which a center and a recording face of the photosensitive recording medium are exposed; a shutter assembled to an outside of the cartridge body and arranged so as to move between a closed position where the opening is closed and an open position where the opening is opened; and an RFID capable of recording disk information with respect to the photosensitive recording medium, wherein the disk information with respect to said photosensitive recording medium is obtained from the RFID.

13 Claims, 8 Drawing Sheets

FIG. 3A
FIG. 3B
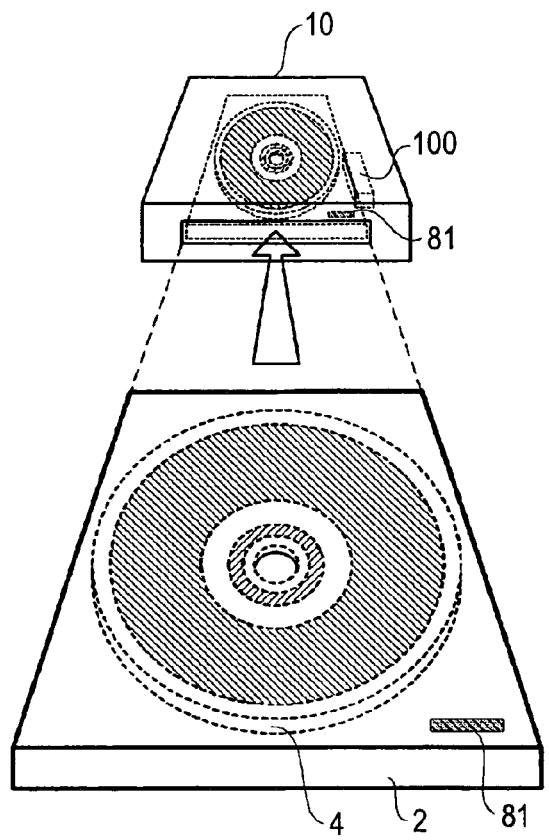
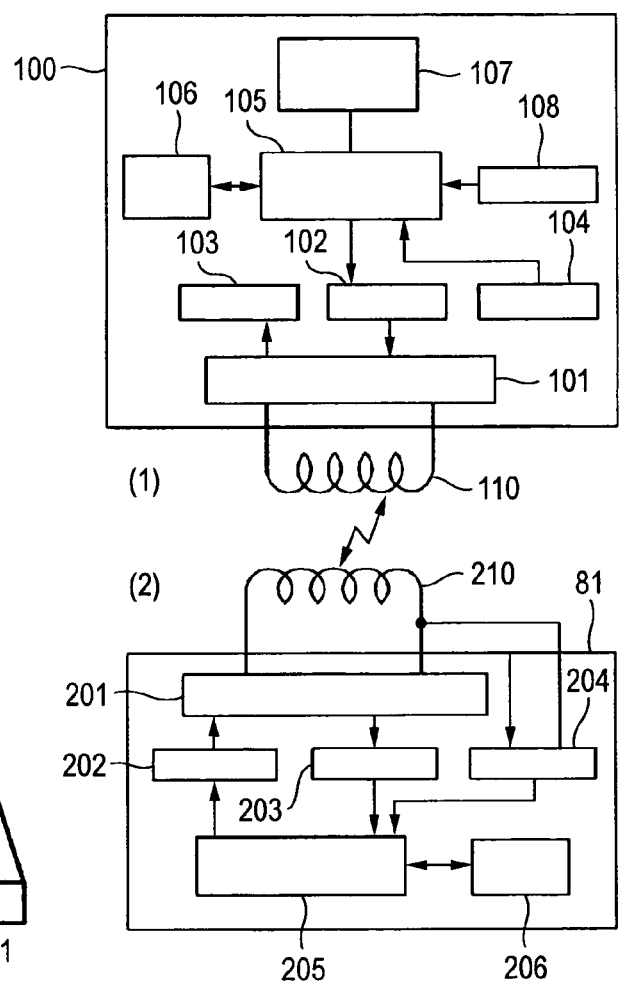

RECORDING AND REPRODUCING APPARATUS FOR PHOTOSENSITIVE RECORDING MEDIUM AND CARTRIDGE THEREOF

FIELD OF THE INVENTION

The present invention relates to a recording and reproducing apparatus for a holographic recording medium, that is, a photosensitive recording medium on which data are recorded holographically.

BACKGROUND OF THE INVENTION

A holographic recording medium on which data are recorded holographically has been already invented.

This holographic recording medium is a photosensitive recording medium which has holographic recording layers each made of photosensitive material provided on a substrate in a shape of a disc. Data are multilayeredly recorded on the holographic recording medium as interference fringes of laser light, so that the holographic recording medium can obtain a larger data recording capacity than that of a DVD which is a recording medium heretofore widespread. Exposure of the holographic recording layers to light or deposition of dust on the holographic recording layers exerts a bad influence on the performance of the holographic recording medium. For this reason, the holographic recording medium has been dealt with in the condition that the holographic recording medium is contained in a cartridge having a light-shielding function and dustproof function, and the cartridge of this type provided with a cartridge body, a shutter member, and a shutter cover has been known (JP-A-2003-317422 (corresponding to US 2003/0198177 A1)).

SUMMARY OF THE INVENTION

Referring to FIG. 7, a flow of operation in the conventional apparatus after the cartridge has been inserted into a recording and reproducing apparatus until recording starts in the recording and reproducing apparatus will be described. Structures of the cartridge, the recording and reproducing apparatus, and a shutter opening mechanism will be described later.

A front end of the cartridge will be butted against a lid of an insertion hole of the recording and reproducing apparatus and a light pressure will be given to the cartridge (Step S21). The lid will be opened (while the shutter of the cartridge is still closed to prevent intrusion of an exterior light), and the cartridge will be pulled into the recording and reproducing apparatus (S22). The shutter will not be opened yet, because the medium which is an object of the invention is photosensitive. After the cartridge has been completely pulled into the recording and reproducing apparatus (S23), the lid of the insertion hole will be closed (S24) to make a dark room inside the apparatus. When the cartridge has arrived at a determined position (a recording position or a reproducing position) (S25), the shutter of the cartridge will be opened by the shutter opening mechanism (26).

After the shutter has been opened, the cartridge is lowered while keeping a horizontal posture in the apparatus (S27), and a chuck of a spindle motor in a lower part of the apparatus which has made access into the cartridge from the opening of the cartridge will chuck a center part of the photosensitive recording medium (S28). This can be conducted in inverse order. Specifically, the cartridge may be fixed inside the apparatus, and the chuck of the spindle motor in the lower part of the apparatus ascends to approach the recording disk through the opening of the cartridge and chuck the center part of the disk (S28). In this manner, the recording disk can be rotated by the spindle motor.

Then, the spindle motor starts to rotate thereby to rotate the recording disk (S29). A pickup moves to a position for reading the disk information (S30). After finish of the movement, focusing (S31) and tracking (S32) of a laser beam will be conducted.

Then, after waiting for rotation, disk information starts to be read (S33). After the disk information has been obtained (S34) the pickup will be moved to a position for recording according to the disk information which has been read (S35), and recording will be started (S36).

By the way, because the holographic recording medium is a write-once recording medium (Write Once Read Many Times), a considerable time has been required from the start of reading in the step S33 to the finish of the reading in the step S34. In other recording mediums which have the disk information recorded always at the same position, it does not take so much time to read determined information. However, the write-once recording medium which is different from above employs such a system that the disk information (an address number showing the last position where writing has been conducted) is appended to a recording area on every occasion when new record is appended. Therefore, in order to know the address number showing the last position where the recording has been conducted, an operator must start from the first writing place of the disk information, and trace the recording areas successively up to the last writing place thereby to find that there is no further record, and he will finally learn the address number of the place where the recording is now going on. Accordingly, it has taken a considerably long time to obtain the disk information.

The invention has been made to solve the above described problems, and it is an object of the invention to provide a recording and reproducing apparatus for a holographic recording medium which can be rapidly shifted to a writing mode, by reducing time required for obtaining information of the last writing position as described above.

In order to solve the above described problem, according to a first feature of the invention, there is provided a recording and reproducing apparatus for a photosensitive recording medium which contains therein a cartridge for the photosensitive recording medium, the cartridge including a disc-shaped photosensitive recording medium, a cartridge body rotatably containing the photosensitive recording medium and having an opening through which a center and a recording face of the photosensitive recording medium are exposed to the exterior, a shutter assembled to an outside of the cartridge body and arranged so as to move between a closed position where the opening is closed and an open position where the opening is opened, and an RFID (Radio Frequency Identification) capable of recording disk information concerning the photosensitive recording medium, thereby to conduct recording and reproduction of the photosensitive recording medium, characterized in that the disk information concerning the photosensitive recording medium is obtained from the RFID.

In the recording and reproducing apparatus for the photosensitive recording medium of the first feature, it would be preferable that the disk information is read at least prior to reproduction. It would be more preferable that the disk information is read prior to chucking, and further preferable that the disk information is read before the shutter is opened.

In the above described recording and reproducing apparatus for the photosensitive recording medium, it is preferable that a pickup is moved to a recording position according to the disk information which has been read.

According to the invention, there is further provided a cartridge for a holographic recording medium characterized in that an RFID which can be used in the recording and reproducing apparatus for the photosensitive recording medium as described above is incorporated therein.

According to a second feature of the invention, which is a modification of the recording and reproducing apparatus for the photosensitive recording medium of the first feature, there is provided a recording and reproducing apparatus for a photosensitive recording medium which contains therein a cartridge for the photosensitive recording medium, the cartridge including a disc-shaped photosensitive recording medium, a cartridge body rotatably containing the photosensitive recording medium and having an opening through which a center and a recording face of the photosensitive recording medium are exposed to the exterior, a shutter assembled to an outside of the cartridge body and arranged so as to move between a closed position where the opening is closed and an open position where the opening is opened, and an RFID (Radio Frequency Identification) capable of recording disk information concerning the photosensitive recording medium, thereby to conduct recording and reproduction of the photosensitive recording medium, characterized in that the RFID includes; a first writing place in which an address number of a recording place of said photosensitive recording medium where data are expected to be recorded is written, before the recording on said photosensitive recording medium is started; and a second writing place in which an address number of a recording place of said photosensitive recording medium where the data is recorded, after the recording on said photosensitive recording medium is finished, so that said address numbers of the first and second writing places can be compared with each other In the recording and reproducing apparatus for the photosensitive recording medium of the second feature, it is preferable that the RFID further includes a third writing place in which an address number of a recording place where previous recording has been conducted on the photosensitive recording medium, whereby when the address number in the first writing place is consistent with the address number in the second writing place, the consistent address number will be written in the third writing place (a third feature).

It is more preferable that in case where the address number in the first writing place is inconsistent with the address number in the second writing place, a backup routine will be actuated according to the address number in the third writing place (a fourth feature).

It is preferable that the backup routine will reproduce the recording medium after the place having the address number in the third writing place thereby to detect a position until which the recording has been accurately conducted, and will conduct additional recording from a position having defective recording (a fifth feature).

It is preferable that in case where the additional recording is difficult, the address number in the first writing place will be advanced by one, and the recording will be conducted in a new recording place of the recording medium (a sixth feature).

In the recording and reproducing apparatus for the photosensitive recording medium of the second to the sixth feature, it is preferable that a backup power supply is further provided, and when writing process has stopped while the address number of the recording place where the recording is to be conducted is being written in the first writing place in the RFID, or while the address number of the recording place where the recording has finished is being written in the second writing place, the backup power supply will be used to follow up the writing process to a finish (a seventh feature).

According to the invention, there is further provided a cartridge for a holographic recording medium characterized in that an RFID which can be used in the recording and reproducing apparatus for the photosensitive recording medium as described above is incorporated therein (an eighth feature).

According to the first feature of the invention, because the disk information has been recorded in the RFID, it is possible to immediately obtain the information of the last writing position, by reading the disk information. Therefore, an access time in the conventional apparatus can be reduced, and the recording and reproducing apparatus for the holographic recording medium which can be rapidly shifted to the writing mode can be obtained.

According to the second feature of the invention, the RFID includes the first writing place in which an address number of a recording place where data are expected to be recorded on the photosensitive recording medium from now on is written, before start of the recording on the photosensitive recording medium, the second writing place in which an address number of a recording place where the data has been recorded, after finish of the recording on the photosensitive recording medium. Therefore, the address numbers of both the first and second writing places can be compared with each other, and in case where they are consistent as the result of comparison, it is found that the recording has been completely conducted.

According to the third feature of the invention, the RFID further includes the third writing place in which an address number of a recording place where previous recording has been conducted on the photosensitive recording medium. Therefore, when the address number in the first writing place is consistent with the address number in the second writing place, it is considered that the recording has been completely conducted, and so, the consistent address number will be written in the third writing place to prepare for the next writing.

According to the fourth feature of the invention, when the address number in the first writing place is inconsistent with the address number in the second writing place, the backup routine will be actuated according to the address number in the third writing place. Therefore, it is possible to solve the inconsistency.

According to the fifth feature of the invention, the backup routine will reproduce the recording medium after the place having the address number in the third writing place thereby to detect a position until which the recording has been accurately conducted, and will conduct additional recording from a position having defective recording. Therefore, it is possible to solve the inconsistency.

According to the sixth feature of the invention, in case where the additional recording is difficult, the address number in the first writing place will be advanced by one, and the recording will be conducted in a new recording place of the recording medium. Therefore, a problem of double recording or the like will be solved.

According to the seventh feature of the invention, because the backup power supply is provided in the recording and reproducing apparatus for the photosensitive recording medium of the second to the sixth feature, it is possible to continue the writing process to be conducted in a short time in the writing place in the RFID.

According to the eighth feature of the invention, because the RFID is incorporated in the cartridge for the disc-shaped holographic recording medium, it is possible to use the RFID in the recording and reproducing apparatus for the photosensitive recording medium of the second to the seventh feature.

BRIEF DESCRIPTION OF THE DRAWINGS

FIG. 3A is a schematic perspective view for describing an internal structure of an RFID, and an internal structure of a recording and reproducing apparatus which is the other end of communication of the same, and FIG. 3B is respective block diagrams of them.

DETAILED DESCRIPTION OF THE INVENTION

Figure 2:
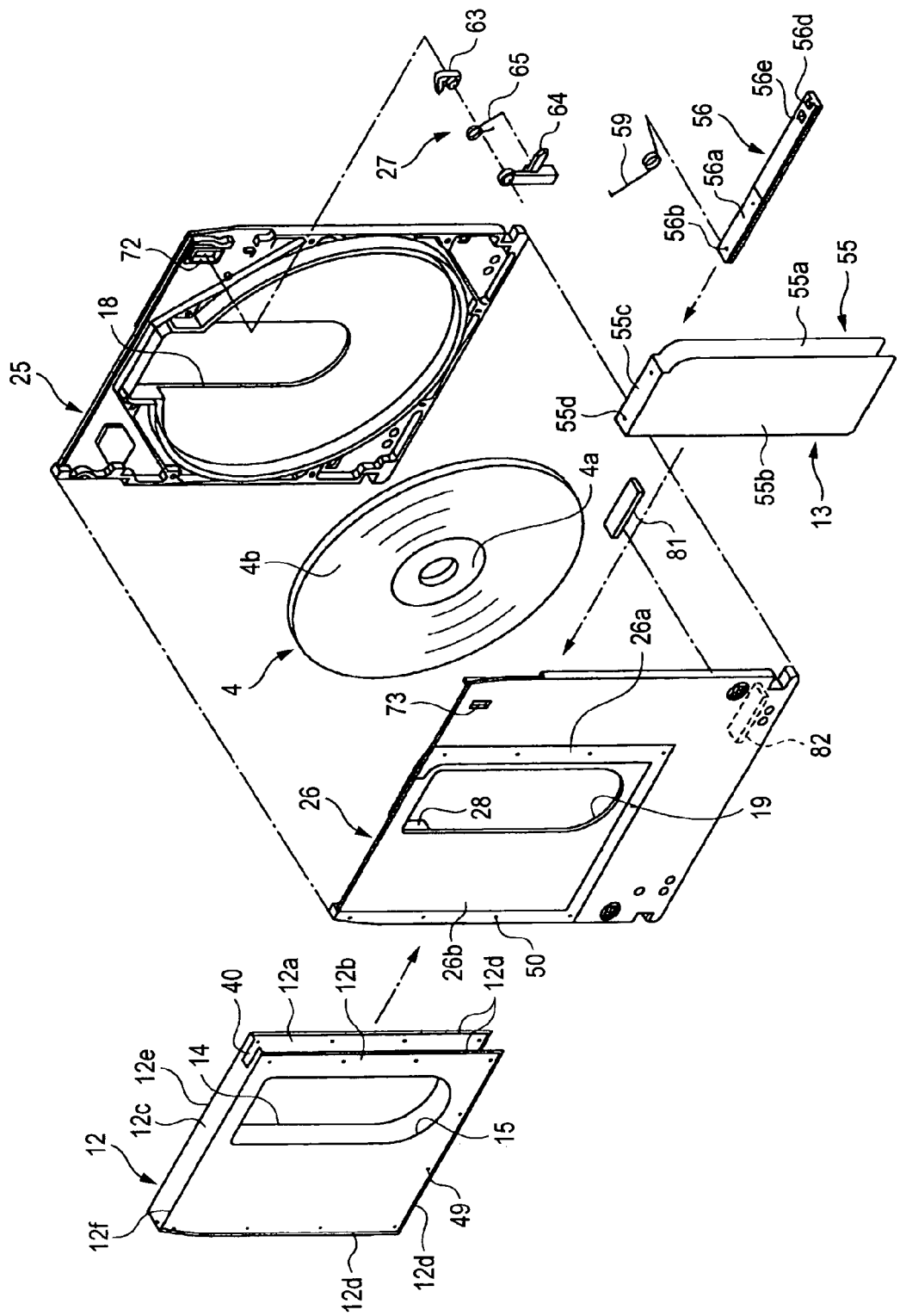
FIG. 2 is an exploded perspective view showing structure of the cartridge which contains a photosensitive recording medium according to the invention.

FIG. 2 is an exploded perspective view showing structure of a cartridge in which the photosensitive recording medium according to the invention is incorporated.

(Description of the Cartridge)

As shown in FIG. 2, a cartridge body includes a first shell 25 substantially in a shape of a plate, a second shell 26 connected to the first shell 25, and a lock mechanism 27 which is incorporated between the first shell 25 and the second shell 26 for locking a shutter 13.

The first shell 25 and the second shell 26 are respectively provided with internal openings 18, 19 through which a central part 4a and a recording face 4b of a recording disk 4 are exposed to the exterior. After the disk 4 has been placed between the first shell 25 and the second shell 26, the first shell 25 is superposed on the second shell 26. By sealing them by ultrasonic welding, a disk cartridge body having a light-shield structure in a labyrinth shape will be obtained.

On outer faces of the first shell 25 and the second shell 26, there are formed light-shield plate attaching surfaces 25a, 26b each offset inward so as to be formed into a size slightly larger than a light-shield plate 12 with stepped portions each having a depth larger than a thickness of the light-shield plate 12.

(Description of the Light-Shield Plate)

As shown in FIG. 2, the light-shield plate 12 is formed by making outer openings 14, 15 and a notch 40 for obtaining a moving range of a shutter 13, in a thin plate of aluminum alloy and by bending the thin plate substantially into a U-shape in section. In this manner, the light-shield plate 12 is provided with a first plate portion 12a having the outer opening 14, a second plate portion 12b having the outer opening 15, and a third plate portion 12c having the notch 40 and connecting the first plate portion 12a to the second plate portion 12b.

Slits are formed in ridgeline parts of the third plate portion 12c with respect to the first plate portion 12a and the second plate portion 12b, and intersection parts with respect to two edges at both sides of an inserting direction C of the cartridge 2 and with respect to one edge intersecting the inserting direction, so that outer edges of the first and second plate portions 12a, 12b are flexed into a substantially C-shape in a direction where they are brought close to each other (In other words, in a direction to approach the cartridge body 11 when the light-shield plate is attached to the cartridge body 11). In this manner, bent portions 12d substantially in a C-shape are formed at the outer edges of the first plate portion 12a and the second plate portion 12b.

The light-shield plate 12 is attached to the light-shield plate attaching surfaces 25a, 26a of the cartridge body 11 in such a manner that A surface and B surface of the cartridge body 11 are held by the first and second plate portions 12a and 12b, and the front end of the cartridge body 11 in the inserting direction C is covered with the third plate portion 12c. The light-shield plate attaching surfaces 25a and 26a are offset inward to have a depth not smaller than the thickness of the light-shield plate 12 so that the outer faces of the light-shield plate 12 attached to the cartridge body 11 will not protrude from the surface of the cartridge 2.

Small holes 49 are formed at intervals of an approximately equal pitch in the outer circumferences of the first and second plate portions 12a and 12b of the light-shield plate 12. In addition, pins 50 each having a length slightly larger than the thickness of the light-shield plate 12 are formed integrally on the light-shield plate attaching surfaces 25a, 26a of the first shell 25 and the second shell 26 at positions corresponding to the holes 49 of the light-shield plate 12. When the light-shield plate 12 is attached to the outside of the cartridge body 11, the pins 50 of the first shell 25 and the second shell 26 are inserted into the holes 49 so as to protrude from the surface of the light-shield plate 12.

(Description of the Shutter)

The shutter 13 include a shutter member 55 which is formed by bending a thin plate having light-shielding performance substantially into a U-shape, and a slide member 56 which is shaped like a long and narrow plate and attached to the shutter member 55. The shutter member 55 includes a first shutter 55a which is inserted between the outer face of the first shell 25 and the first plate portion 12a of the light-shield plate 12, a second shutter 55b which is inserted between the outer face of the second shell 26 and the second plate portion 12b of the light-shield plate 12, and a connecting portion 55c. The connecting portion 55c connects the first shutter 55a to the second shutter 55b, and the slide member 56 is attached to the connecting portion 55c.

Shutter slide faces 25b, 26b offset inward to have a depth not smaller than the thickness of the shutter member 55 are formed on the outer faces of the first shell 25 and the second shell 26 inside the light-shield plate attaching surfaces 25a, 26a. In this manner, the shutter 13 can move between the cartridge body and the light-shield plate 12 so smoothly that generation of chips etc. due to the movement of the shutter 13 can be suppressed.

The shutter 13 is urged in the closing direction by a shutter spring 59. The shutter spring 59 is formed of a torsion coil spring, for example. Opposite ends of the shutter spring 59 are locked to the slide member 56 and the inner face of the first shell 25.

(Description of the Slide Member)

The slide member 56 is slidably incorporated between the first shell 25 and the second shell 26 so that the upper face of the slide member 56 may be exposed from the front end face of the cartridge body 11 in the inserting direction. An attaching face 56a to be attached to an inner face of the connecting portion 55c of the shutter member 55 is provided in an end part of an upper face of the slide member 56. Two pins 56b for example are integrally formed on this attaching face 56a. When the two pins 56b are inserted into two holes 55d formed in the connecting portion 55c and distal ends thereof are melted down by heat, the shutter member 55 and the slide member 56 will be fixed to each other.

An operated portion 56d to be operated for opening the shutter 13 is integrally formed in the other end part of the upper face of the slide member 56. By providing the slide member 56 so as to extend with respect to the shutter member 55 in a direction to close the shutter, the operated portion 56d is exposed to the exterior without being hidden by the third plate portion 12c of the light-shield plate 12. The notch 40 in the third plate portion 12c of the light-shield plate 12 is provided for the purpose of avoiding interference with the operated portion 56d, when the shutter 13 has moved to an open position. A lockable groove 56e in a shape of a rectangular hole is formed adjacent to the operated portion 56d in the slide member 56.

(Incorporation of an RFID According to the Invention)

According to the invention, an RFID (Radio Frequency Identification) is provided inside the cartridge body. Denoted by numeral 81 is the RFID. The RFID 81 is attached to a support rib 82 which is projected from the inner face of the second shell 26.

By storing data in this RFID, and making the RFID communicated with an RFID recording and reproducing apparatus (described blow) by radio waves, the RFID can be utilized almost permanently without a cell by non-contact power transmission from the antenna side. In this manner, it will be possible to read and write in the RFID, even in a shielded dark room inside the drive.

(Structure of the RFID)

FIG. 3A is a schematic perspective view for describing an internal structure of the RFID, and an internal structure of the recording and reproducing apparatus which is the other end of the communication, and FIG. 3B is respective block diagrams of them.

As shown in FIGS. 3A and 3B, the RFID 81 includes an RF (Radio Frequency) circuit 201, a modulation circuit 202, a demodulation circuit 203, a power supply circuit 204, a CPU 205, and a memory 206 which is connected to the CPU and stores information intrinsic to an optical disk 4.

The power supply circuit 204 incorporates a condenser (not shown), which cooperates with the coil 210 to form a resonant circuit. The condenser will be charged with electric power which is generated by electromagnetic induction when the coil 210 has received a radio wave having a specific resonant frequency.

The power supply circuit 204 will rectify and stabilize this electric power, and supply it to the CPU 205 thereby to activate the RFID 81. The memory 206 includes a ROM, a RAM, and an EEPROM, and will read the stored data according to a reading command by data communication of the radio waves under control of the CPU 205, and will write the data according to a writing command from the recording and reproducing apparatus.

(Structure of the RFID Recording and Reproducing Apparatus)

An antenna 110 is connected to the RFID recording and reproducing apparatus 100 which will read the data from the RFID 81. The recording and reproducing apparatus 100 includes a power supply circuit 104 which incorporate a battery, an RF (Radio Frequency) circuit 101, a modulation circuit 102, a demodulation circuit 103, a CPU 105, a memory 106, a display 107, and an input device 108.

The RFID recording and reproducing apparatus 100 will transmit radio waves having a specific frequency to the coil 210 of the optical disk 4 by way of the antenna 110 thereby to activate the RFID 81, and reproduce the data in the memory 206 of the RFID 81. The reproduced data will be received from the coil 210 by way of the antenna 110. The RFID recording and reproducing apparatus 100 will discriminate the optical disk 4 and read the information of the optical disk 4 from the memory 106 to display it on the display 107.

The invention is characterized in that the disk information (an address number showing the last position where writing has been performed) of the recording medium 4 is recorded in the memory 206 of the RFID 81 other information (for example, a title, a type, contents, and a recording time of the recorded data) can be also recorded.

(Structure of the Recording and Reproducing Apparatus for the Photosensitive Recording Medium)

Figure 4:
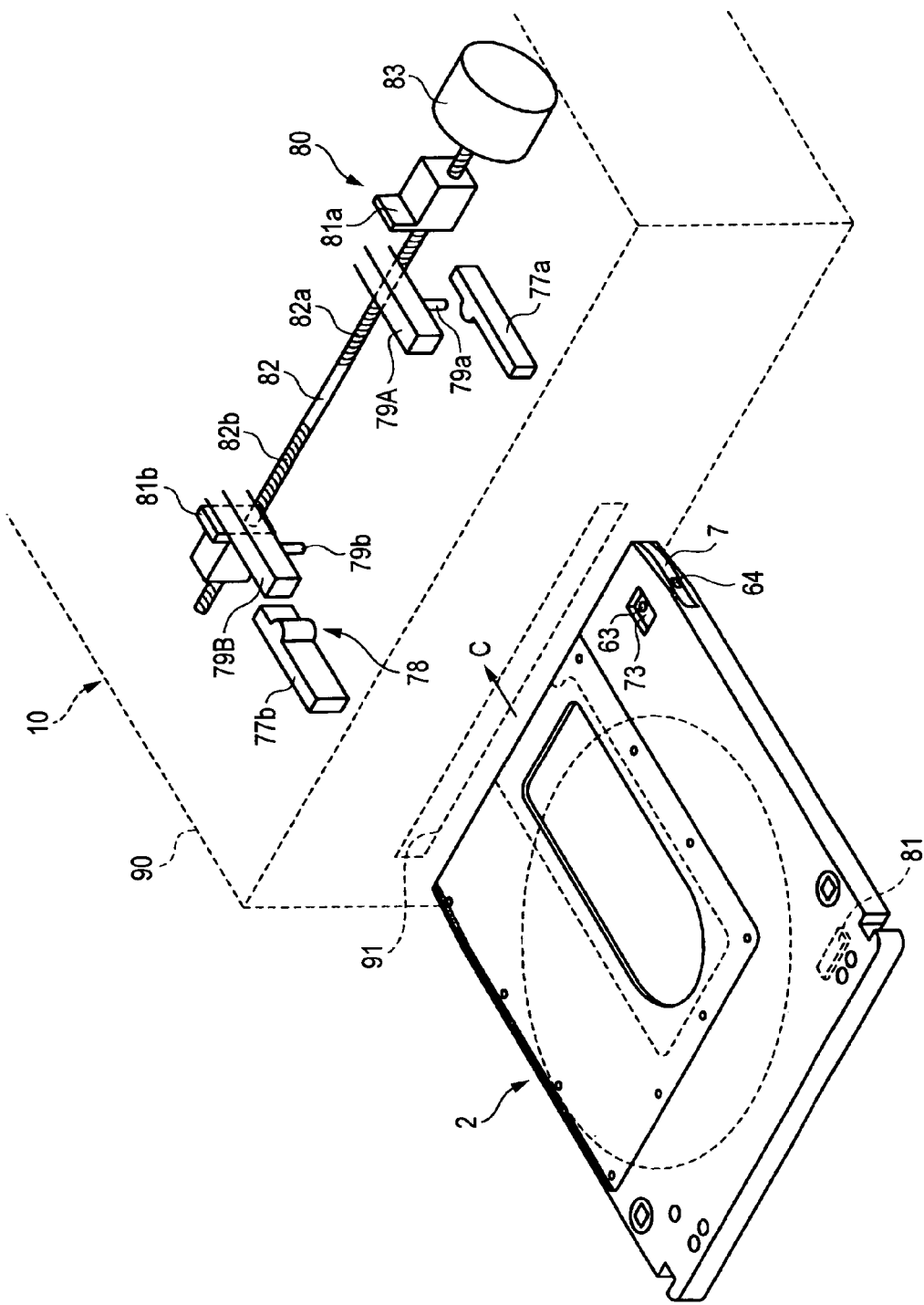
FIG. 4 is a perspective view showing an example of the recording and reproducing apparatus which contains therein a holographic recording medium to conduct recording and reproducing processes.
Figure 5:
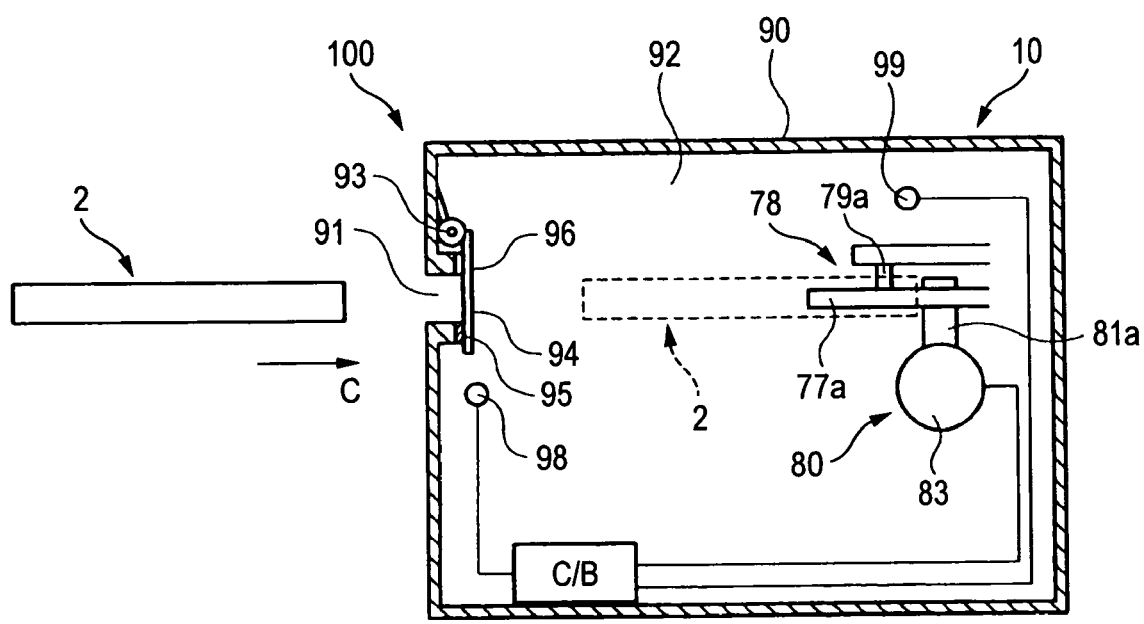
FIG. 5 is a schematic view showing an internal structure of the recording and reproducing apparatus.

FIG. 4 is a perspective view showing one example of the recording and reproducing apparatus which contains therein this holographic recording medium to conduct recording and reproducing process. FIG. 5 is a schematic view showing an internal structure of the recording and reproducing apparatus.

As shown in FIGS. 4 and 5, a recording and reproducing apparatus 10 into which a cartridge 2 is loaded for use includes a casing 90 which is provided with an insertion hole 91 into which the cartridge 2 can be inserted, and has an internal space 92 shielded from exterior light. The insertion hole 91 will be opened or closed by an insertion hole shutter 94 which is disposed inside the casing 90 so as to be rotated around a pin 93. One end of a torsion coil spring 96 is locked to the insertion hole shutter 94 to urge the insertion hole shutter 94 in a closing direction. A light-shield member 95 is fixed to an entire circumferential part of the insertion hole 91 and cooperates with the insertion hole shutter 94 to shield the insertion hole 91 from the exterior light.

An unlock mechanism 78 and a shutter opening mechanism 80 are incorporated in the casing 90.

(Description of the Unlock Mechanism)

The unlock mechanism 78 includes a pair of positioning members 77a and 77b which are second disengaging members to be engaged with a second look member 64, and a pair of engagement pins 79a and 79b which are first disengaging members to be engaged with a first lock member 63.

The pair of the positioning members 77a, 77b are fixed to the casing 90 and extend toward the insertion hole 91 so as to be engaged with positioning grooves 7 and 8 on both side faces of the cartridge 2 which has been inserted in a direction of an arrow mark C. The pair of the positioning members 77a, 77b will be respectively engaged with the positioning grooves 7, 8 thereby to position the cartridge 2 both in an insertion direction of the cartridge and in a direction perpendicular to the insertion direction.

The pair of the engagement pins 79a, 79b are projected downward from a pair of arms 79A and 79B which are fixed to the casing 90, and will be inserted into an operation hole of the first lock member 63 through openings 72 and 73 of the cartridge 2 which has been inserted. Since data can be recorded on both faces of the recording disk 4, the cartridge 2 will be set in the recording and reproducing apparatus 10 with either of the A surface and B surface directed upward. In case where the cartridge 2 has been loaded with a wrong surface directed upward, a position of, the lock mechanism 27 will be reversed from right to left. For this reason, the unlock mechanism 78 is provided with the engagement pin 79b to be used for inverse loading so that the engagement pin 79b can be engaged with the operation hole even when the cartridge 2 has been loaded inversely.

The pair of the engagement pins 79a, 79b are urged downward by springs (not shown) so as to project from the arms 79A, 79B retractably. Accordingly, when one of the engagement pins is engaged with the operation hole, the other engagement pin will retract into the arm 79 and will not be an obstacle.

(Description of the Shutter Opening Mechanism)

The shutter opening mechanism 80 includes a pair of operating pieces 81a and 81b to be butted against an outside of the operated portion 56d of the slide member 56, and a lead screw 82 having a right-hand thread 82a and a left-hand thread 82b formed at both end parts. The operating piece 81a is engaged with the right-hand thread 82a of the lead screw 82, while the operating piece 81b is engaged with the left-hand thread 82b. A rotation shaft of a drive motor 83 is fixed to one end of the lead screw 82 so that the lead screw 82 can be rotated in a clockwise direction or in a counterclockwise direction.

When the lead screw 82 has rotated in a counterclockwise direction, the operating pieces 81a, 81b move in a direction to approach each other, and push the operated portion 56d thereby to slide the shutter 13 to the open position. The reason why the operating portions 81a, 81b are provided in pair is for the purpose of dealing with the inverse insertion of the cartridge 2.

(Operation of the Recording and Reproducing Apparatus 10)

When the cartridge 2 is loaded in the recording and reproducing apparatus (holographic recording apparatus) 10, the positioning member 77a (FIG. 4) fixed to the recording and reproducing apparatus 10 will be inserted into the positioning groove 7 (FIG. 4) thereby to position the cartridge 2. At the same time, the positioning member 77a presses a pressure piece of the second lock member 64 against an urging force of the lock spring 65. The second lock member 64 rotates in a clockwise direction around a link portion, and a bottom face of a rotation portion leaves a regulation piece, so that the first lock member 63 can slide downward.

The cartridge 2 will be further inserted in the direction of the arrow mark C. When the operation hole of the first lock member 63 has reached the position of the engagement pin 79a of the unlock mechanism 78 which is secured inside the apparatus, the engagement pin 79a will be inserted into the operation hole of the first lock member 63 by an action of a spring which is incorporated in the arm 79. Then, the cartridge 2 will be further inserted thereby to move the first lock member 63 so as to withdraw a lock claw from the lockable groove 56e so that the engagement will be released. In this manner, the lock mechanism 27 of the cartridge 2 will be released, whereby the shutter 13 will be allowed to be opened.

(System for Preventing the Shutter from being Opened when a Light Leaks into the Apparatus)

Inside the casing 90 (FIG. 5), there are provided an illumination sensor 98 for detecting brightness inside the casing 90, and a cartridge sensor 99 for detecting the front end of the cartridge 2 which is inserted from the insertion hole 91 to detect that the cartridge 2 has been accurately inserted up to the determined position.

Figure 6:
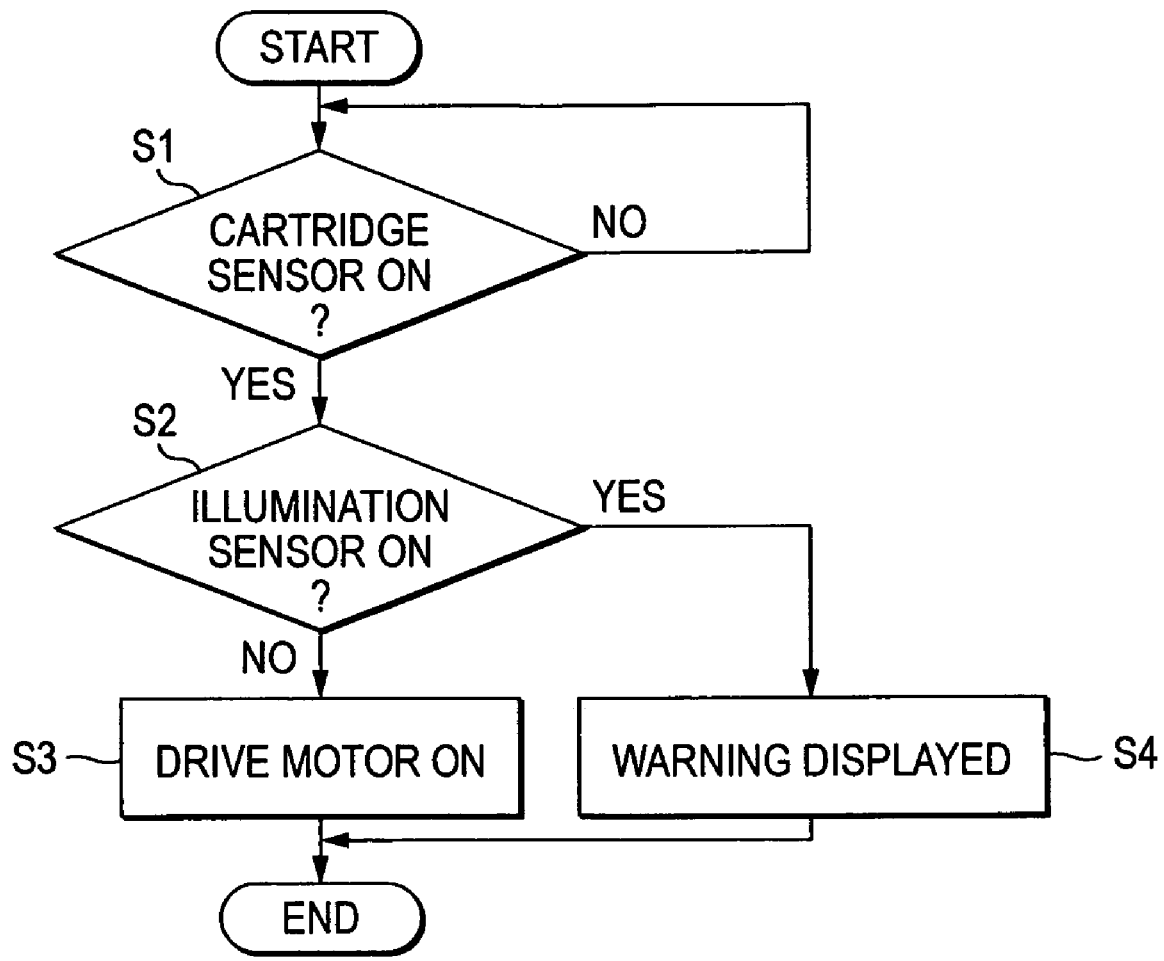
FIG. 6 is a flow chart of a system in which a shutter is not opened when a light leaks into the apparatus.

As shown by a flow chart in FIG. 6, when the cartridge 2 has arrived at the determined position, the cartridge sensor 99 will be turned on by detecting the front end of the cartridge 2, and detect that the cartridge 2 has been accurately inserted up to the determined position (S1). On this occasion, the lock mechanism 27 of the cartridge 2 has already been released, and the shutter 13 has been allowed to open. However, the operating piece 81a of the shutter opening mechanism 80 is arranged outside the operated portion 56d of the slide member 56, and will not yet start to work.

Then, the illumination sensor 99 will detect the brightness. In case where the brightness is below a determined brightness, the illumination sensor 99 will determine that the casing 90 is shielded from light (S2), and rotate the drive motor 83 thereby to rotate the lead screw 82 in a counterclockwise direction (S3). Consequently, the operating pieces 81a, 81b which are respectively engaged with the right-hand thread 82a and the left-hand thread 82b of the lead screw 82 move so as to come close to each other to press the operated portion 56d, whereby the shutter 13 will be moved to open. Then, the data will be recorded by a head (not shown) while the recording disk 4 is rotated or the recorded data will be reproduced.

On the other hand, in case where the brightness detected by the illumination sensor 98 is above the determined brightness (S2), there is such anxiety that the recording disk 4 may be exposed. Therefore, the shutter 13 will not be opened, and attention of the operator will be called by displaying a warning on a display device (not shown), or by ejecting the cartridge 2 from the recording and reproducing apparatus 10 (S4).

In this manner, the lock mechanism 27 will not be released unless the second lock member 64 is rotated and the first lock member 63 is slid. Therefore, it is possible to effectively prevent the shutter 13 from being opened unintentionally.

Moreover, the lock mechanism 27 will be automatically unlocked when the cartridge 2 is inserted into the recording and reproducing apparatus 10, and the shutter 13 will be opened after the recording and reproducing apparatus 10 has been shielded from light. Accordingly, exposure of the recording disk 4 can be reliably prevented.

Operation mechanism after the cartridge 2 has been inserted into the recording and reproducing apparatus 10, until the shutter 13 is opened after the recording and reproducing apparatus 10 has been shielded from light has been heretofore described.

(Method of Using the RFID which is Provided According to the Invention)

Figure 1:
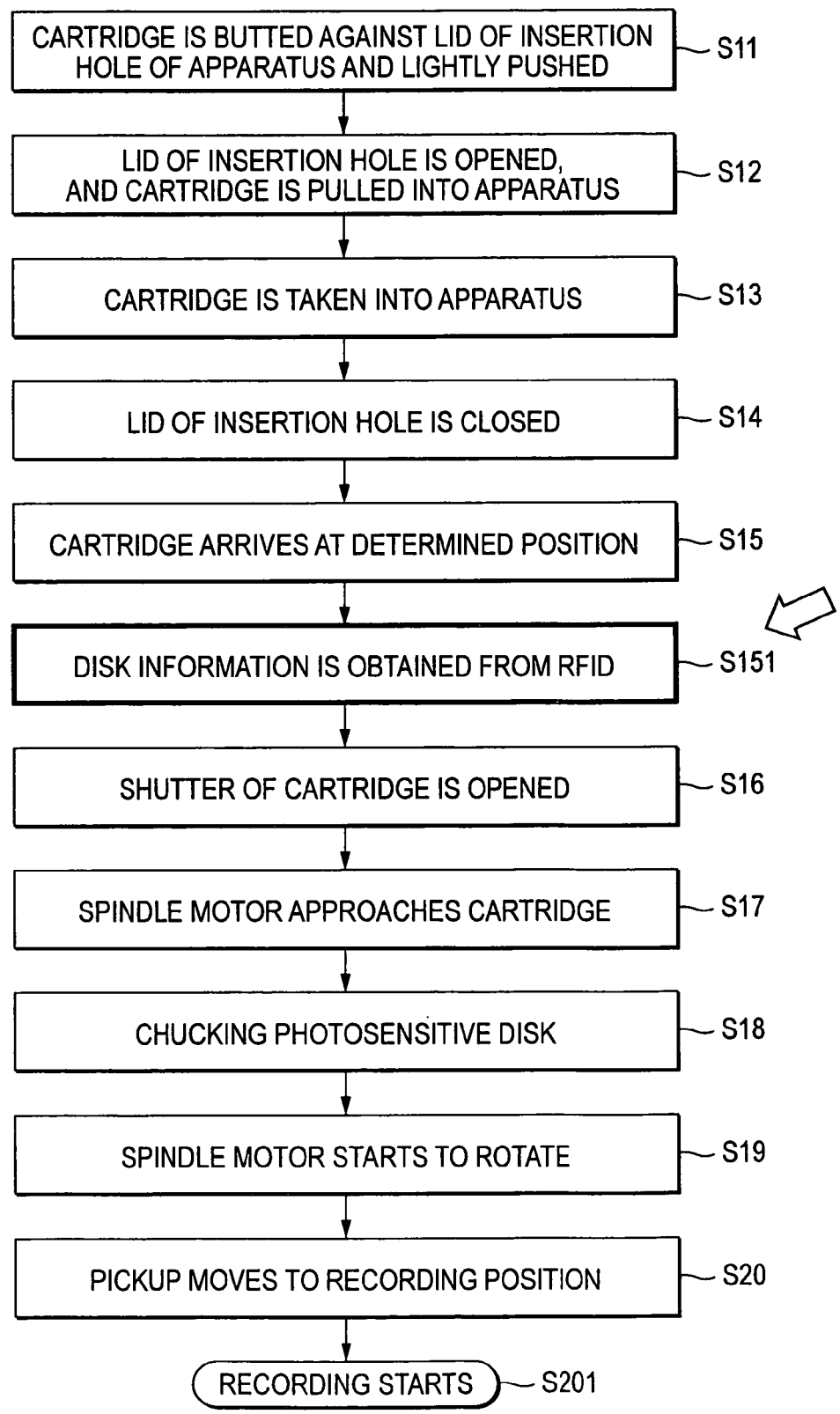
FIG. 1 is a flow chart for describing a flow of operation, after a cartridge according to the invention has been inserted into the recording and reproducing apparatus until the recording and reproducing apparatus starts to record.

Now, referring to FIG. 1, a flow of operation after the cartridge 2 has been inserted into the recording and reproducing apparatus until the recording and reproducing apparatus starts to record, will be described.

The front end of the cartridge will be butted against a lid of the insertion hole of the recording and reproducing apparatus and a light pressure will be given to the cartridge (Step S11). The lid will be opened (On this occasion, an exterior light will enter), and the cartridge will be pulled into the recording and reproducing apparatus (S12). The shutter will not be opened yet, because the medium which is an object of the invention is photosensitive. After the cartridge has been completely pulled into the recording and reproducing apparatus (S13), the lid of the insertion hole will be closed (S14) to make a dark room inside the apparatus. When the cartridge has arrived at a determined position (a recording position or a reproducing position) (S15), the contents (including the disk information) of the RFID 81 of the cartridge 2 will be read by the RFID recording and reproducing apparatus 100, and according to the disk information which has been read, a position to which the pickup should move will be grasped (S151).

Thereafter, preparations for recording will follow. The shutter of the cartridge will be opened by the shutter opening mechanism (S16). After the shutter has been opened, the cartridge will be lowered while keeping a horizontal posture (S17). A chuck of the spindle motor located in the lower part of the apparatus which has made access into the cartridge from the opening of the cartridge will chuck the center part of the photosensitive recording medium (In this case, the flow may be reversed as described above) (S18). Consequently, the recording disk will be allowed to rotate by the spindle motor. Then, the spindle motor will rotate (S19) thereby to rotate the recording disk. The pickup will move to the writing position according to the disk information which has been read from the RFID 81 (S20), and the writing process will be started (S201).

Figure 7:
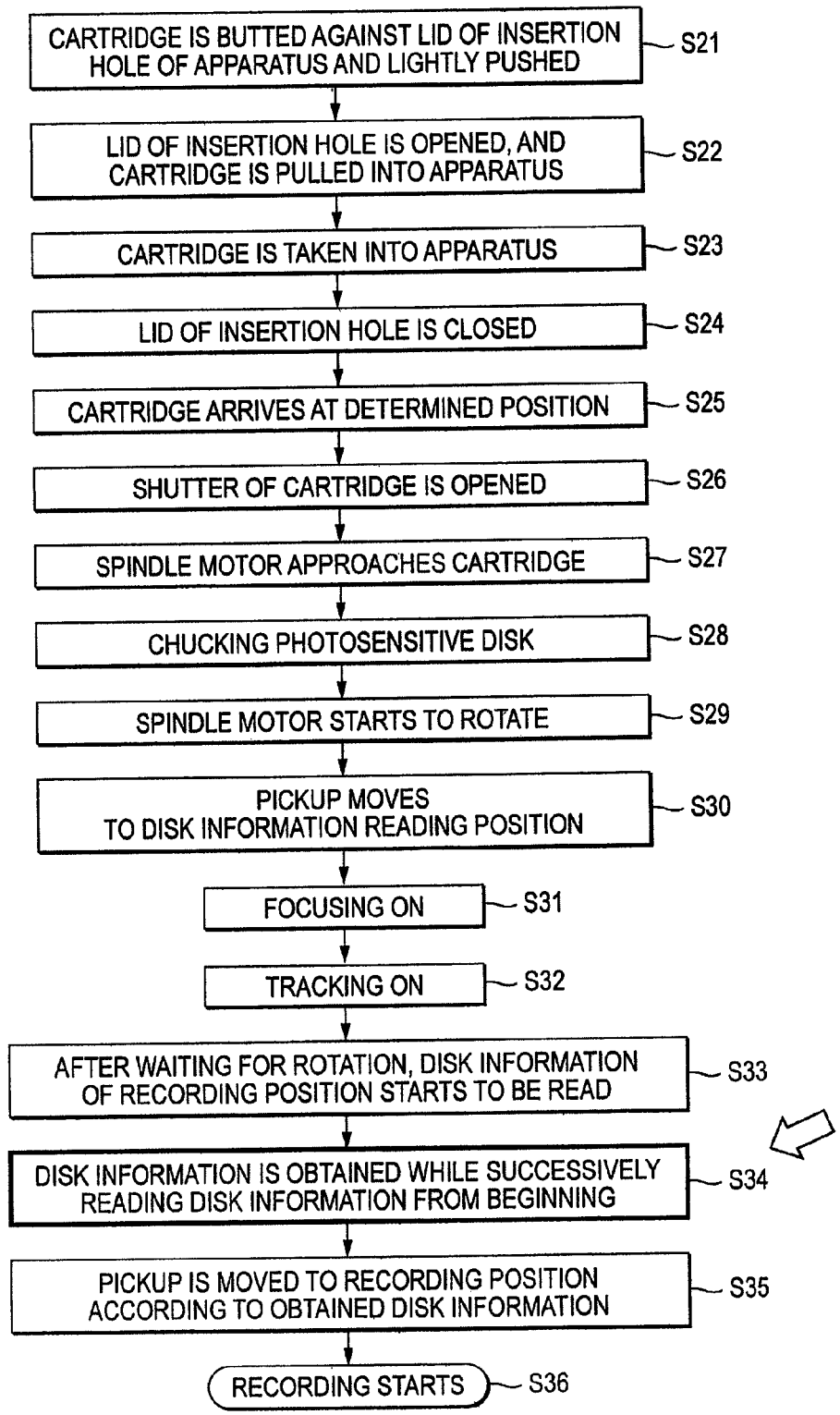
FIG. 7 is a flow chart for describing a flow of operation in the conventional recording and reproducing apparatus after the cartridge has been inserted into the apparatus until the apparatus starts to record.

As described above, according to the recording and reproducing apparatus for the holographic recording medium of the invention, the information of the last writing position can be instantly obtained from the RFID in the step S151 (an arrow mark) even in case of the write-once recording medium. Therefore, the steps of inspecting the last writing position in the steps S30 to S34 in the flow chart of the conventional apparatus in FIG. 7 can be omitted, and it is possible for the recording and reproducing apparatus to rapidly shift to the writing mode.

Moreover, it would be more convenient to write the following information including the above described information, as the information to be written in the RFID.

(1) To write address information in the RFID.

Because the position for the next recording can be detected according to this address information, it is possible to perform rapid inspection. Specifically, because the holographic recording medium is a write-once recording medium, it has been impossible to record updated disk information at the same position at every updating, but the disk information to be updated must be appended to a place next to the place where the previous disk information has been recorded, in the conventional method wherein the disk information (the address information of the recording place for the next recording) has been written in the holographic recording medium. Therefore, in order to know the address number of the place for the next recording, the operator must start from the first writing place of the disk information, trace the recording areas successively, and proceed to the final writing place to finally learn that there is no further record, whereby the address number of the place where the recording is now on (as the results, the place for the next recording will be learned) can be detected. In this manner, it has taken a considerably long time to obtain the newest disk information. In view of the circumstances, the above described drawback can be overcome, because it is possible to write the newest disk information always in the same place of the RFID.

(2) To record contents which are recorded in the RFID, in the recording medium too.

The RFID is easily handled on one hand, but likely to be broken on the other hand. Therefore, it would be preferable that the contents recorded in the RFID are recorded in the recording medium too, and fixed if possible, so as not to be altered, to perpetuate the recording medium as a back-up.

(3) To make the address information of the RFID in the above item (1) consistent with the record in the recording medium.

Timing when the address information is written in the RFID is not always consistent with the timing when recording is made in the relevant address of the recording medium (It is of course desirable to keep consistency, but it is actually difficult), and either of the timing precedes the other timing. In this case, when an accident such as interruption of electric service has happened to stop the recording process, the address information in the RFID and the record in the recording medium become inconsistent. For the purpose of avoiding such phenomenon, the RFID may be provided with a starting address storing place in which the address of the starting position of the record in the recording medium is written, and a finishing address storing place in which the address of the finished record is written. When the addresses of both the storing places are consistent, it will be found that the address information of the RFID in the above item (1) and the record in the recording medium are consistent. In case where they are inconsistent, it is considered that an accident has happened, and both of them will be written again.

(4) To record an ID number of the RFID tag and an ID number of the cartridge (may be the recording medium) in the RFID. By inspecting security by linking these ID numbers, it is possible to prevent the contents recorded in the recording medium from being altered.

(5) To record an ID number of the hardware (the recording and reproducing apparatus) in the RFID, so that recording can be made when the ID number of the hardware is consistent with all the ID numbers, in addition to the above item (4).

(6) To record information of errors in the RFID. By recording the information in the RFID when errors have occurred during recording, it is possible to trace afterward at which parts of the recording medium a large number of errors have occurred during the recording, which will serve to elucidate causes for the errors.

(7) To record the number of loadings (additional writings) in the RFID.

In the write-once recording medium, additional writings cannot be made so many times. Therefore, the number of loadings had better be recorded for reference of future loading.

(8) To record the number of fixings in the RFID.

After recording has been finished in the holographic recording medium, a light is once irradiated to a recorded part to fix the record. However, the light is not always irradiated to the recorded part only (although it is so intended), but actually, the light of a lamp will leak to spread all over the recording medium. Consequently, the recording will not be conducted when the number of fixings exceeds a certain number. For this reason, it would be advantageous to learn the number of fixings.

(9) To record specifications of the recording medium in the RFID.

In case where a thickness, recording speed, diameter, forwarding pitch, etc. which are specifications of the recording medium are recorded in the RFID, it would be convenient because desired numerical values can be instantly obtained from the RFID.

(10) To record general information of the RFID in the RFID. In case where ISO standardizing rules of the RFID, and characteristic functions of each manufacturer are recorded in the RFID, it would be convenient because desired information can be obtained from the RFID.

Figure 8:
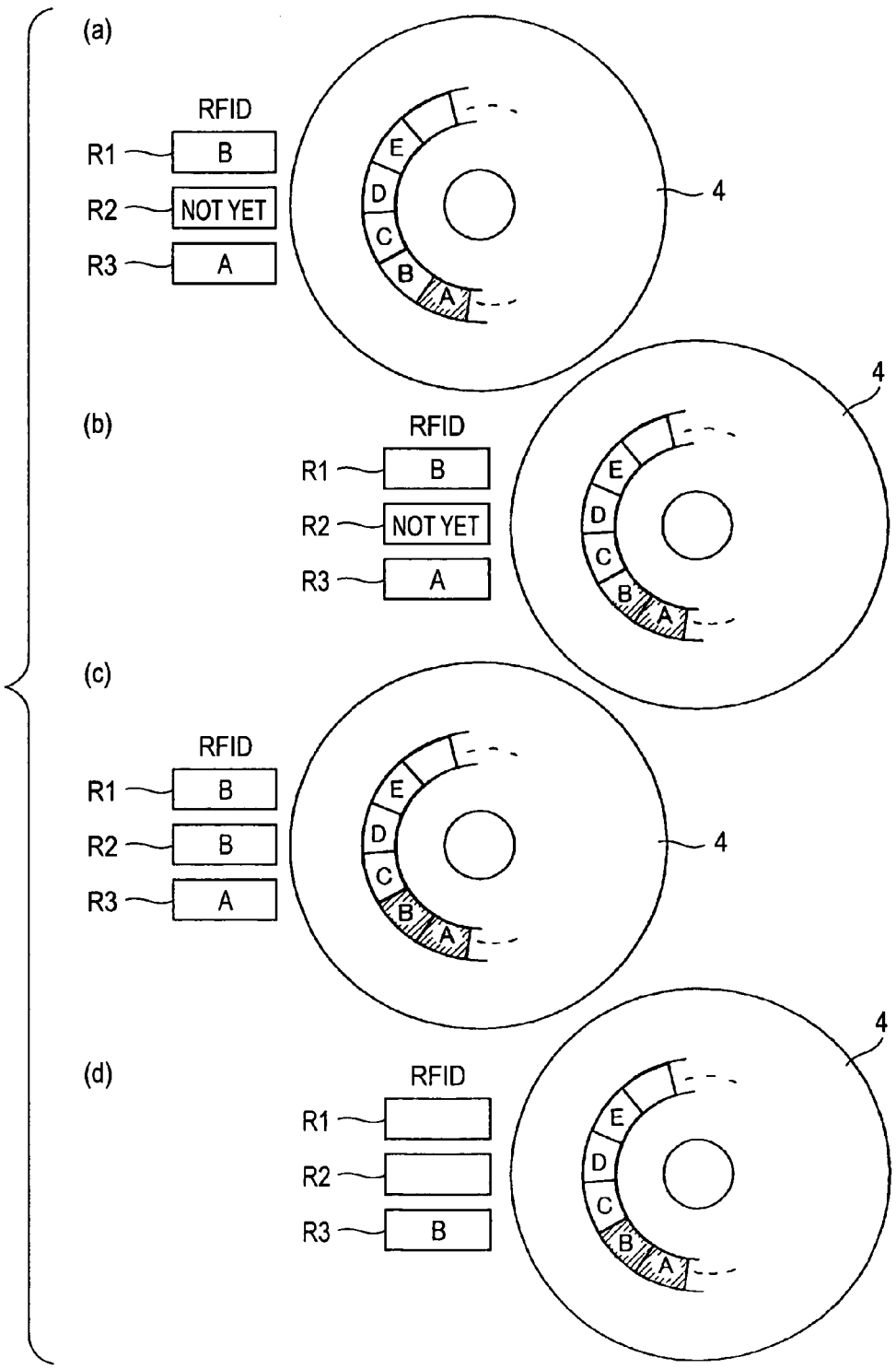
FIG. 8 is a view for describing a method of additional recording in the recording and reproducing apparatus for the photosensitive recording medium according to the invention, in which (a) to (c) show a flow of time.

Referring to FIG. 8, an embodiment according to a second to eighth features of the invention will be described.

In FIG. 8, (a) to (c) represent a flow of time. R1 is an address storage memory (a first memory) which stores in advance an address number of a position where writing is expected to be conducted from now on, before the writing is conducted on the recording medium. R2 is an address storage memory (a second memory) which stores an address number showing the last position where the writing has been conducted on the recording medium, after the writing has been finished R3 is an address storage memory (a third memory) which stores an address number of the place where the previous recording has been conducted. All these memories are provided in the RFID attached to the cartridge. A to E represents recording positions in the write-once recording medium 4, and the recording will be conducted in order of A→B→C→D→E (Although an actual track is small in both width and length, the drawings are enlarged to be easily seen).

A case where the recording has been already conducted in the recording position A, and is going to be conducted in the recording position B will be described.

When the recording has started (a time point (a)), the address showing the recording position B where recording is expected to be conducted from now on will be written in the address storage memory R1. Because the recording has not yet finished, a sign "NOT YET" for example will be written in the address storage memory R2. The address showing the recording position A where the recording has been already conducted will be written in the address storage memory R3.

At a time point (b) when a considerable time has lapsed after start of the recording, the recording has advanced halfway in the recording position B of the recording medium 4. On this occasion, the address storage memory R1 shows "B", the address storage memory R2 shows "NOT YET", and the address storage memory R3 still shows "A".

At a time point (c), recording to the recording position B is completed, and at that time, "B" is written in the address storage memory R2 for the first time. At that time, the address storage memory R3 still shows "A".

At a time point (d), "B" in the address storage memory R1 is compared with "B" in the address storage memory R2. In case where both of them are consistent, "B" will be written in the address storage memory R3. Then, the contents of the address storage memory R1 and the address storage memory R2 will be cleared.

On this occasion, in case where the address number in the address storage memory R1 and the address number in the address storage memory R2 are inconsistent, a backup routine will be actuated, according to the address number in the address storage memory R3, and the data from the position of the address number in the address storage memory R3 (A, in this case) up to the last position (the recording position B) will be reproduced to detect the position until which the recording has been conducted accurately. Then, the data after the place having a defective recording will be additionally written.

In this manner, the contents which have been recorded at the first recording position will be read, as well as the contents to be written at the same recording position of the first step in the recording position B, and both of them are compared to detect whether they are consistent. In case where they are consistent, the flow will proceed to the second step. By repeating this process, it is possible to detect the place having defective recording.

In case where the contents which have been recorded in the recording position cannot be read, it is considered that additional writing is difficult. In this case, the address of the writing place will be advanced by one, so that recording may be conducted in a new recording place (the recording position C, in this embodiment) of the recording medium.

Moreover, it would be desirable to additionally provide a backup power supply. When the process has stopped by interruption of the electric service while the address number is written in the address storage memory R1 or while the address number is written in the address storage memory R2, it would be preferable to continue the writing using the backup power supply and complete the writing. Power consumption is not so large when the address number is written in the address storage memory. In addition, because the recording has not at all been conducted (R1) or the recording has already finished (R2) at this moment, it would be inefficient, to the contrary, to operate the backup routine according to the address number in the address storage memory R3.

As has been heretofore described, according to the second to the eighth features of the invention, the backup power supply is provided so that the contents which has been written in the RFID may not be different from the record which has been actually conducted in the recording medium, even though interruption of the electric service has occurred during recording, whereby the recording work can be continued or a difference will be found out and corrected, if it should happen. Therefore, it is possible to obtain the reliable recording and reproducing apparatus for the holographic recording medium which can be rapidly shifted to the writing mode.

This application is based on Japanese Patent application JP 2005-276435, filed Sep. 22, 2005, and Japanese Patent application JP 2005-280126, filed Sep. 27, 2005, the entire contents of which are hereby incorporated by reference, the same as if set forth at length.

What is claimed is:

1. An apparatus for recording and reproduction of a photosensitive recording medium, which accommodates a cartridge, said cartridge including: a photosensitive recording medium; a cartridge body rotatably accommodating said photosensitive recording medium and having an opening through which a center and a recording face of said photosensitive recording medium are exposed; a shutter assembled to an outside of said cartridge body and arranged so as to move between a closed position where said opening is closed and an open position where said opening is opened; and an RFID capable of recording disk information with respect to said photosensitive recording medium, wherein said disk information with respect to said photosensitive recording medium is obtained from said RFID, wherein said RFID includes: a first writing place in which an address number of a place of said photosensitive recording medium where data are expected to be recorded is written, before the recording on said photosensitive recording medium is started; and a second writing place in which an address number of a place of said photosensitive recording medium where the data is recorded, after the recording on said photosensitive recording medium is finished, so that said address numbers of the first and second writing place can be compared with each other.

2. The apparatus as claimed in claim 1, wherein said disk information is read at least prior to reproduction.

3. The apparatus as claimed in claim 2, wherein said disk information is read prior to chucking.

4. The apparatus as claimed in claim 3, wherein said disk information is read before said shutter is opened.

5. The apparatus as claimed in claim 2, wherein a pickup is moved to a recording position according to said read disk information.

6. The apparatus as claimed in claim 3, wherein a pickup is moved to a recording position according to said read disk information.

7. The apparatus as claimed in claim 4, wherein a pickup is moved to a recording position according to said read disk information.

8. The apparatus as claimed in claim 1, wherein said RFID further includes a third writing place in which an address number of a place where previous recording is conducted on said photosensitive recording medium, so that when the address number in said first writing place is consistent with the address number in said second writing place, said consistent address number is written in said third writing place.

9. The apparatus as claimed in claim 8, wherein in case where the address number in said first writing place is inconsistent with the address number in said second writing place, a backup routine is actuated according to the address number in said third writing place.

10. The apparatus as claimed in claim 9, wherein said backup routine is to reproduce said recording medium after a place having the address number in said third writing place so as to detect a position until which the recording is accurately conducted, and conduct additional recording from a position having defective recording.

11. The apparatus as claimed in claim 10, wherein in case where said additional recording is difficult, the address number in said first writing place is advanced by one, and the recording is conducted in a new place of the recording medium.

12. The apparatus as claimed in claim 1, wherein a backup power supply is further provided, and when writing process is stopped while the address number of the place of said photosensitive recording medium where data are expected to be recorded is written in the first writing place in said RFID, or while the address number of the place of said photosensitive recording medium where the data is recorded is written in the second writing place, said backup power supply is used to follow up the writing process to a finish.

13. A cartridge for a holographic recording medium, wherein an RFID which is capable of being used in said apparatus as claimed in claim 1 is incorporated therein.

\* \* \* \* \*